US008478909B1

(12) United States Patent  (10) Patent No.: US 8,478,909 B1
Sarcar et al.  (45) Date of Patent: Jul. 2, 2013

(54) METHOD AND SYSTEM FOR COMMUNICATION ACROSS MULTIPLE CHANNELS

(75) Inventors: Kanoj Sarcar, Fremont, CA (US); Kenneth Y. Choy, Alamo, CA (US); Sanjeev Jorapur, San Jose, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 12 days.

(21) Appl. No.: 12/914,852

(22) Filed: Oct. 28, 2010

Related U.S. Application Data

(60) Provisional application No. 61/366,008, filed on Jul. 20, 2010.

(51) Int. Cl.
*G06F 3/00* (2006.01)
*G06F 5/00* (2006.01)
*G06F 13/28* (2006.01)

(52) U.S. Cl.
USPC .................... 710/26; 710/36; 710/15

(58) Field of Classification Search
USPC ............................... 710/26, 36, 15
See application file for complete search history.

(56) References Cited

U.S. PATENT DOCUMENTS

| | | | |
|---|---|---|---|
| 5,321,695 A | 6/1994 | Faulk, Jr. | |
| 6,154,796 A | 11/2000 | Kuo et al. | |
| 6,175,900 B1 | 1/2001 | Forin et al. | |
| 6,473,818 B1 | 10/2002 | Niu et al. | |
| 6,504,846 B1 | 1/2003 | Yu et al. | |
| 6,640,290 B1 | 10/2003 | Forin et al. | |
| 6,738,875 B1 | 5/2004 | Wang | |
| 6,757,803 B1 | 6/2004 | Lin et al. | |
| 7,046,686 B1 | 5/2006 | Tompkins et al. | |
| 7,222,150 B1 | 5/2007 | Phillips et al. | |
| 7,480,298 B2 | 1/2009 | Blackmore et al. | |
| 7,895,601 B2* | 2/2011 | Benner et al. ................. | 719/314 |
| 2005/0021558 A1 | 1/2005 | Beverly et al. | |
| 2007/0016637 A1 | 1/2007 | Brawn et al. | |
| 2009/0287843 A1* | 11/2009 | Morimura ..................... | 709/236 |

FOREIGN PATENT DOCUMENTS

WO WO2008/031273 3/2008

* cited by examiner

*Primary Examiner* — Idriss N Alrobaye
*Assistant Examiner* — Zachary K Huson
(74) *Attorney, Agent, or Firm* — Klein, O'Neill, & Singh, LLP

(57) ABSTRACT

Machine implemented method and system is provided. The method includes sending a packet to a device by a computing system; determining an address for the packet, where an interface logic for the device determines the address; updating a location associated with the address; where the interface logic for the device updates the location; updating a bitmap value associated with the location to indicate to a processor for the device that a location associated with the address has been updated; where the interface logic updates the bitmap value; clearing the bitmap value by writing a same value that is read by the processor for the device; and processing the packet received by the device.

19 Claims, 2 Drawing Sheets

METHOD AND SYSTEM FOR COMMUNICATION ACROSS MULTIPLE CHANNELS

CROSS-REFERENCE TO RELATED APPLICATIONS

This patent application claims priority under 35 USC 119 (e) to the U.S. Provisional Application, Ser. No. 61/366,008, filed on Jul. 20, 2010, entitled "Method and System for Communication Across Multiple Channels", the disclosure of which is incorporated herein by reference in its entirety.

TECHNICAL FIELD

This disclosure is related to computing systems and peripheral devices.

BACKGROUND

Computing systems typically include a processor executing instructions for performing various tasks, for example, communicating with other devices via an adapter. The adapter may send and receive information on behalf of the computing systems (may also be referred to as host systems).

The host system processor typically uses communication channels to communicate with the adapter. A channel is defined by a state that is maintained both by the host system and the adapter. Typically, a register dedicated to the channel is maintained by the adapter for facilitating communication between the host system and the adapter.

Typically, the host system sends a packet to the adapter with a request for performing a task. The packet is stored at the register dedicated to the communication channel. The adapter typically includes a processor that reads the packet and then performs the requested task.

As computing systems continue to operate in complex environments multiple channels may be used for communication between the host system and the adapter. Multiple registers are also used for storing packets received from the host system. To process the packets, the adapter processor has to determine which register has been updated at any given time.

One way the adapter processor may determine that a register has been written is by receiving interrupts, which can be time consuming and disruptive. Another method to determine if a register has been written or updated can be to poll the various registers and then determine which one has been updated. This can consume computing resources, especially if there are a large number of registers. Continuous efforts are being made to improve communication between the host system and an adapter.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment, a machine implemented method is provided. The method includes sending a packet to a device, where the packet is sent by a computing system. An interface logic for the device then determines the address determining an address for the packet.

The method further includes updating a location associated with the address, where the interface logic for the device updates the location; updating a bitmap value associated with the location to indicate to a processor for the device that a location associated with the address has been updated; where the interface logic updates the bitmap value; clearing the bitmap value by writing a same value that is read by the processor for the device; and processing the packet received by the device.

In another embodiment, a machine implemented method is provided. The method includes sending a packet to an adapter by a computing system; updating a location associated with an address included with the packet; where an interface logic for the adapter updates the location; and updating a bitmap value at a bitmap register to indicate to a processor for the adapter that a location associated with the address has been updated.

The method further includes clearing the bitmap value by writing a same value that is read by the processor for the adapter; and processing the packet received by the adapter.

In yet another embodiment, a system is provided. The system includes a computing system operationally coupled to a device. The computing system sends a packet to the device and the device includes an interface logic that is configured to determine an address for the packet, to update a location associated with the address, and to update a bitmap value associated with the location to indicate to a processor for the device that a location associated with the address has been updated. The processor clears the bitmap value by writing a same value that is read by the processor and processes the packet.

This brief summary has been provided so that the nature of the disclosure may be understood quickly. A more complete understanding of the disclosure can be obtained by reference to the following detailed description of the preferred embodiments thereof concerning the attached drawings

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1:
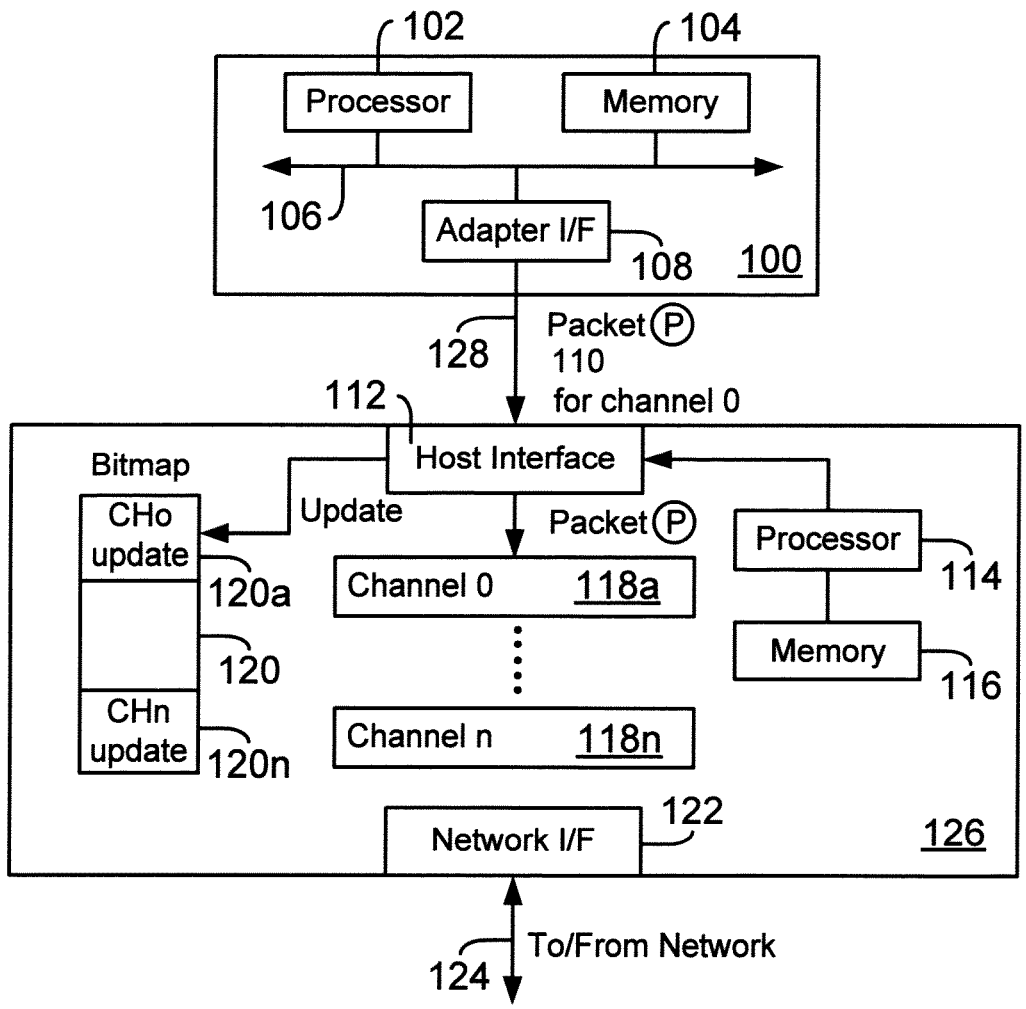
FIG. 1 is a block diagram of a system used according to one embodiment.

The following detailed description describes the present embodiments with reference to drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

To facilitate an understanding of the various embodiments, the general architecture and operation of a networking system will be described. The specific architecture and operation of the various embodiments will then be described with reference to the general architecture.

FIG. 1 shows a block diagram of a computing system 100 (also referred to as host system 100). Computing system 100 typically includes several functional components. These components may include a central processing unit (CPU or processor) 102, main memory 104, and adapter interface 108, coupled via a bus 106. Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

Host system 100 interfaces with memory 104 that may include random access main memory (RAM), and/or read only memory (ROM). When executing stored computer-executable process steps from storage (not shown), the processor 102 may store and execute the process steps out of memory 104. ROM may store invariant instruction sequences, such as start-up instruction sequences or basic input/output operating system (BIOS) sequences for operation of a keyboard (not shown).

Host system 100 may also use an adapter interface 108 to interface with adapter 126, as described below. The link 128 between adapter 126 and adapter interface 108 may be a peripheral bus, for example, a PCI bus, a PCI-X bus or a PCI-Express link or any other type of interconnect.

Adapter 126 may be configured to handle both network and storage traffic using various network and storage protocols to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein is based on using Ethernet (which includes 100 Base-T and/or Gigabit Ethernet) as the network protocol. However, the adaptive embodiments disclosed herein are not limited to any particular protocol, as long as the functional goals are met by an existing or new network protocol. For example, RDMA (remote direct memory access)/iWARP (Internet Wide Area RDMA Protocol), InfiniBand (IB) protocol with RoCEE support, where RoCEE facilitates running the IB transport protocol using Ethernet frames.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 126 shown in FIG. 1 may be configured to operate as a FCOE adapter and may be referred to as FCOE adapters 126. QLogic Corporation, the assignee of the present application, provides one such adapter. Those of ordinary skill in the art will appreciate, however, that the present embodiments are not limited to any particular protocol. The illustrated FCOE adapter 126 is merely one example of a converged network adapter that may leverage the advantages of the present embodiments.

Another common protocol that may be used by adapter 126 is the iSCSI protocol. The iSCSI standard is based on Small Computer Systems Interface ("SCSI") which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

Referring back to FIG. 1, adapter 126 interfaces with host system 100 via a host interface 112 (also referred to as host interface logic 112). The structure of host interface logic 112 depends on the link type and the protocol used for host system and adapter communication. For example, if link 128 is a PCI Express link, then host interface 112 includes all the logic and circuitry to handle PCI Express packets.

Adapter 126 includes a processor 114 that executes firmware instructions out of memory 116 to control overall adapter 126 operations. Adapter 126 also includes a network interface module 122 (or network interface logic) that is used to send and receive data to and from network via link 124.

Adapter 126 also includes various registers, shown as Channel 0 (118a) to Channel n (118n). The registers are used to store packets that are sent to adapter 126 or information regarding the packets. When host system 100 sends a packet, for example, packet 110, it specifies an address for the packet, for example, an address for Channel 0 118a. The packet may include a request for adapter 126 to perform a task as well as include data/status for a network connection. Host interface 112 places the packet at the appropriate address (for example, 118a).

Adapter 126 includes a bit map register 120 where a bit value indicates if a particular register has been updated. For example, a value written at 120a indicates if register 118a has been updated. Similarly, a value at 120n indicates if register 118n has been updated.

After host interface 112 places the packet at location 118a, it updates the bit value at bitmap location 120a. The adapter processor 114 can read the bitmap register value to find out which set of registers (for example, 118a and others) have been updated. The adapter processor 114 clears the bit map register 120 by writing back the value that it read. Thereafter, processor 114 reads Channel 0 118a (and possibly other channel registers as indicated by the bitmap register value) and performs the requested tasks for each channel (for example, sending data or a status).

Figure 2:
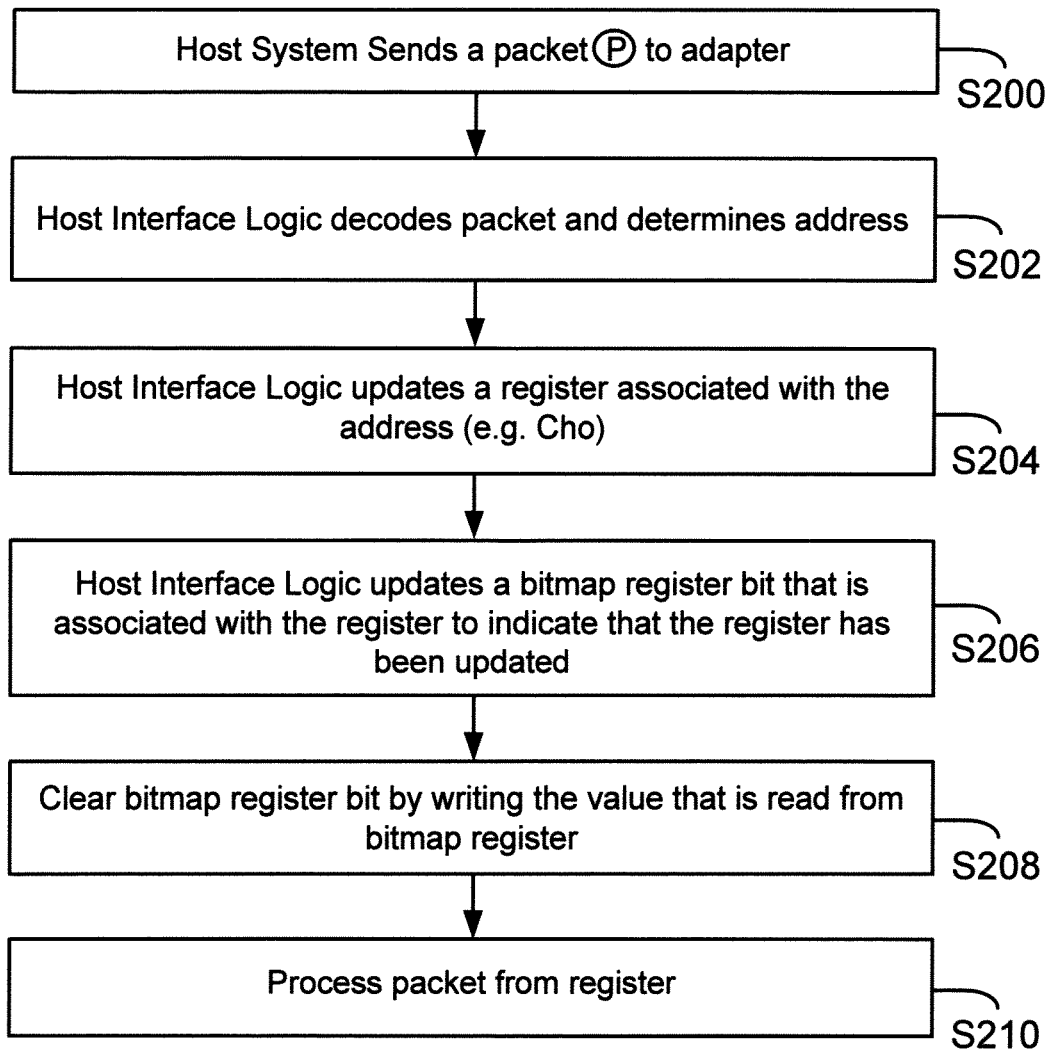
FIG. 2 shows a process flow diagram according to one embodiment.

Process Flow:

FIG. 2 shows a process flow diagram for handling information packets received by adapter 126 from host system 100. The process starts in block S200, when host system 100 sends a packet 110 to adapter 126. As an example, the packet may be destined for Channel 0 (118a).

In block S202, host interface logic 112 decodes the packet and determines the address for the packet. In block S204, the location associated with the address, i.e. 118a is updated by host interface logic 112.

In block S206, host interface logic 112 updates a bit map register 120a. As described above, the bit map register value indicates to processor 114 that the register associated with the bit map location has been updated. In this example, if host interface logic 112 writes a value of 1 to bit map register 120a then that indicates to processor 114 that Channel 0 has been updated.

In block S208, processor 114 reads a certain value from bit map register 120a and then writes the same value to clear the bit map register. Thereafter, processor 114 (or any other logic) processes the packet from the identified updated channel registers in block S210.

The embodiments disclosed herein have various advantages. For example, processor 114 does not have to continuously poll registers 118a-118n to determine if they have been written. Processor 114 simply reads the bit map register to determine if a register associated with a bit map register location has been updated. This saves time in situations where channel register access cost is expensive in terms of using computing resources. Furthermore, interrupts for processor 114 are not needed when registers 118 are updated. The embodiments disclosed herein improve overall host system and adapter communication.

Although the present disclosure has been described with reference to specific embodiments, these embodiments are illustrative only and not limiting. Many other applications and embodiments of the present invention will be apparent in light of this disclosure. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
sending a packet to a device coupled to a computing system, wherein the packet is sent by the computing system;
determining an address for temporarily storing the packet, wherein an interface logic for the device determines the address;
updating a location associated with the address by temporarily storing the packet at the location; wherein the interface logic for the device updates the location;
updating a bitmap value at a bitmap register associated with the location to indicate to a processor for the device that the location has been updated; wherein the interface logic updates the bitmap value at the bitmap register that stores a plurality of bitmap values, each bitmap value corresponding to a storage location indicating whether the storage location has been updated with a new packet;
the processor for the device reading the bitmap value at the bitmap register to determine that the location has the packet;
clearing the bitmap value by writing a same value to the bitmap register that is read by the processor for the device; and
processing the packet received by the device.

2. The method of claim 1, wherein the device is an adapter.

3. The method of claim 2, wherein the location associated with the address is a register.

4. The method of claim 2, wherein the adapter is configured to process Ethernet related traffic.

5. The method of claim 2, wherein the adapter is configured to process Fibre Channel traffic.

6. The method of claim 2, wherein the adapter is configured to handle Fibre Channel over Ethernet traffic.

7. The method of claim 2, wherein the adapter is configured to handle remote direct memory access (RDMA) traffic.

8. The method of claim 2, wherein the adapter is configured to handle Internet Wide Area RDMA Protocol (iWARP) traffic.

9. The method of claim 2, wherein the adapter is configured to handle InfiniBand traffic.

10. A machine implemented method, comprising:
sending a packet to an adapter coupled to a computing system, wherein the packet is sent by the computing system;

updating a location associated with an address included with the packet by temporarily storing the packet at the location; wherein an interface logic for the adapter updates the location;

updating a bitmap value at a bitmap register associated with the location at a bitmap register to indicate to a processor for the adapter that the location has been updated, wherein the interface logic updates the bitmap value at the bitmap register that stores a plurality of bitmap values, each bitmap value corresponding to a storage location indicating whether the storage location has been updated with a new packet;

the processor for the device reading the bitmap value at the bitmap register to determine that the location has the packet;

clearing the bitmap value by writing a same value to the bitmap register that is read by the processor for the adapter; and processing the packet received by the adapter.

11. The method of claim 10, wherein the adapter is configured to process Ethernet related traffic.

12. The method of claim 10, wherein the adapter is configured to process Fibre Channel traffic.

13. The method of claim 10, wherein the adapter is configured to handle Fibre Channel over Ethernet traffic.

14. The method of claim 10, wherein the adapter is configured to handle remote direct memory access (RDMA) traffic.

15. The method of claim 10, wherein the adapter is configured to handle Internet Wide Area RDMA Protocol (iWARP) traffic.

16. The method of claim 10, wherein the adapter is configured to handle InfiniBand traffic.

17. A system, comprising:

a computing system operationally coupled to a device, where the computing system sends a packet to the device and the device includes an interface logic that is configured to determine an address for temporarily storing the packet, to update a location associated with the address by temporarily storing the packet at the location, and to update a bitmap value at a bitmap register associated with the location to indicate to a processor for the device that the location has been updated, wherein the interface logic updates the bitmap value at the bitmap register that stores a plurality of bitmap values, each bitmap value corresponding to a storage location indicating whether the storage location has been updated with a new packet; wherein the processor reading the bitmap value at the bitmap register to determine that the location has the packet and clears the bitmap value by writing a same value to the bitmap register that is read by the processor and processes the packet.

18. The system of claim 17, wherein the device is an adapter.

19. The system of claim 17, wherein the location associated with the address is a register.

* * * * *

UNITED STATES PATENT AND TRADEMARK OFFICE
CERTIFICATE OF CORRECTION

| | | |
|---|---|---|
| PATENT NO. | : 8,478,909 B1 | Page 1 of 1 |
| APPLICATION NO. | : 12/914852 | |
| DATED | : July 2, 2013 | |
| INVENTOR(S) | : Kanoj Sarcar et al. | |

It is certified that error appears in the above-identified patent and that said Letters Patent is hereby corrected as shown below:

In the Specification

In column 5, line 41, delete "5200" and insert -- S200 --, therefor.

Signed and Sealed this
Thirteenth Day of May, 2014

Michelle K. Lee
*Deputy Director of the United States Patent and Trademark Office*